United States Patent
Bouzid et al.

(10) Patent No.: US 7,280,205 B2
(45) Date of Patent: *Oct. 9, 2007

(54) ON-CHIP SPECTRAL FILTERING USING CCD ARRAY FOR IMAGING AND SPECTROSCOPY

(75) Inventors: Ahmed Bouzid, Lincoln, NE (US); David L. Franzen, Lincoln, NE (US); Christopher Lesiak, Lincoln, NE (US)

(73) Assignee: Li-Cor, Inc., Lincoln, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/554,178

(22) Filed: Oct. 30, 2006

(65) Prior Publication Data

US 2007/0165222 A1    Jul. 19, 2007

Related U.S. Application Data

(63) Continuation-in-part of application No. 10/906,698, filed on Mar. 2, 2005, now Pat. No. 7,130,041.

(51) Int. Cl.
*G01J 3/28*    (2006.01)
(52) U.S. Cl. ..................................... 356/326
(58) Field of Classification Search ............... None
See application file for complete search history.

(56) References Cited

U.S. PATENT DOCUMENTS

| 6,636,752 | B1* | 10/2003 | Madarasz et al. ........... 600/310 |
| 7,130,041 | B2* | 10/2006 | Bouzid et al. .............. 356/303 |
| 2002/0154315 | A1* | 10/2002 | Myrick ....................... 356/451 |
| 2003/0082516 | A1* | 5/2003 | Straus ........................... 435/4 |

* cited by examiner

*Primary Examiner*—Tu T Nguyen
(74) *Attorney, Agent, or Firm*—Novak Druce DeLuca + Quigg LLP (57) ABSTRACT

A spectral filtering apparatus and method is presented, which enables the functions of hyperspectral imaging to be performed with increased speed, simplicity, and performance that are required for commercial products. The apparatus includes a photosensitive array having a plurality of photosensitive elements such that different subsections of photosensitive elements of the array receive light of a different wavelength range of a characteristic spectrum of a target, and output electronics combines signals of at least two photosensitive elements in a subsection of the array and outputs the combined signal as a measure of the optical energy within a bandwidth of interest of the characteristic spectrum.

22 Claims, 10 Drawing Sheets

Read only one line per "filter" (4 total) and fast-dump the rest.

ON-CHIP SPECTRAL FILTERING USING CCD ARRAY FOR IMAGING AND SPECTROSCOPY

CROSS REFERENCE TO RELATED APPLICATION AND CLAIM FOR PRIORITY

This application is a continuation-in-part of and claims priority under 35 U.S.C. § 120 from application Ser. No. 10/906,698 filed Mar. 2, 2005 now U.S. Pat. No. 7,130,941, now U.S. Pat. No. 7,130,041.

FIELD OF THE INVENTION

The present invention relates generally to imaging and spectral analysis, and more particularly relates to apparatus and methods for imaging, data acquisition, filtering and processing.

BACKGROUND OF THE INVENTION

Various imaging, scanning, and detection techniques for detecting and quantifying fluorescent labels are known in the art. These techniques differ in their detection capability, speed, and cost, but a common challenge to all fluorescence imaging techniques is the separation of the light used to excite the targeted fluorophores from the emitted fluorescence light. One common method uses a combination of dichroic filters/beamsplitters and band-pass filters that isolate the fluorescence light for detection. This approach is characterized by limitations as to the number of separate fluorescence emissions and the number of detection channels that can be used in the same system in parallel. Significantly, this approach requires fixed band-pass filters and thus cannot be easily changed to adapt to variations in the wavelength(s) of the fluorescence light being detected.

Another approach is to use a tunable band-pass filter, either between the emitted fluorescence and the detector, or in front of the illuminating source. For example, U.S. Pat. No. 5,379,065 discloses a spectral imaging device for use on a space vehicle to acquire terrestrial surface images, wherein a spectrally agile filter (SAF) is used to rapidly change the spectral pass band to acquire multiple images through different spectral filters; U.S. Pat. No. 6,690,466 discloses a spectral illuminator that is controlled to selectively emit light in each of a number of independent wavelength bands. The type of filter used and the tuning method depends on the speed of tunability, insertion loss, and whether the imaging method is a point imager or an area imager. The tunable band-pass filter approach falls into the multi-spectral class if the operating spectral resolution is coarse (e.g., on the order of tens of nanometers) and into the hyperspectral class if it has a much higher spectral resolution (e.g., in the sub-nanometer range) U.S. Pat. Nos. 6,495,363 and 6,495,818 provide examples of hyperspectral filtering. In the prior art hyperspectral methods, the data is processed post image acquisition.

The tunable band-pass filter approach requires the use of at least one tunable filter per detection channel, and measurements need to be taken at each spectral position (i.e., wavelength band) sequentially. Unless the technology used in tuning the filter is fast, this approach tends to be slow, particularly if higher spectral resolution is needed. Of the various tunable filters implemented in fluorescence filtering, the fastest are Liquid Crystal (LC) filters as disclosed in the '466 patent, and Acousto-Optic filters (AOTF) as disclosed in the '065 patent. These filters are fast, but they are expensive and suffer from high optical insertion loss. Furthermore, since they require sequential detection band-by-band, they can result in a much slower process than the filter itself is capable of. Another type of device that can be used as a tunable filter is the spectrometer. This device can perform the function of tuning the wavelength being detected, but at a much slower speed since the mode of tuning is typically mechanical. Spectrometers also are expensive and have an even higher insertion loss than the LC or AOTF filters.

Yet another approach in fluorescence detection is the use of spectrally dispersive elements, such as gratings and prisms, to spread the spectral content of the collected light across an array detector. The desired spectral resolution and the method of imaging dictate the type of dispersive element to use. Similar to the tunable filter approach, the dispersive element approach can fall either into the multi-spectral class or the hyperspectral class depending on its targeted spectral resolution. This method further requires the use of some type of array detector. It typically uses either a linear array detector with point imaging, or an area array detector with line imaging. In both cases, one dimension of the array detector is used for wavelength distribution. For this reason, an image is acquired for one point or one line at a time. The illumination/detection device is then scanned across the target in order to build the whole two-dimensional image. An array of spectral data is acquired for each imaged point/line and stored in a host computer. The spectral filtering of the data is processed after the scan is finished. In this manner the data is available for application of various schemes of filtering, and therefore the data processing can be optimized for the desired function at hand. The dispersive element approach thus offers significant flexibility as compared to the fixed filter and the tunable filter approaches. However, because a significant amount of data is read and stored for each point or line, the speed of operation and the storage capacity required can become overwhelming, even for a small area scan. This has been one of the main reasons that this approach has not moved into commercialization.

As an example of the storage requirements for a hyperspectral operation with post-acquisition processing, we consider the case of scanning a single microscope slide (25 mm×75 mm) with 5 μm spatial resolution and 5 nm spectral resolution across a 400 nm spectral range. Assuming that line illumination is used, the entire 25 mm width of the slide is imaged at once, and the line is scanned across the 75 mm length of the slide. This means that 5000 image pixels are needed for the line in order to obtain the 5 μm spatial resolution (25 mm/5 μm) across the width, and that 15,000 lines must be scanned in order to obtain the 5 μm spatial resolution (75 mm/5 μm) across the length. So, a frame of $5000\times(400 \text{ nm}/5 \text{ nm})=400\times10^3$ pixels are read every line or $6\times10^9$ pixels for a microscope slide. With a 12 bit A/D conversion, this means that 9 gigabytes of storage capacity would be needed for the scan data of a single standard size microscope slide.

Consequently, there exists a need to reduce the amount of data processing and storage requirements and thereby the required speed of scanning and processing operations, in order to benefit from the flexibility of hyperspectral imaging. The present invention offers a powerful way to harness such filtering flexibilities with only minimal data manipulations and substantially reduced storage capacity requirements.

SUMMARY OF THE INVENTION

The present invention overcomes the restrictions of the prior art and provides a significant advance in the art. An important concept underlying the invention is that the processing "smartness" that is usually performed after imaging data acquisition is built into the array detector itself. In other words, the array detector itself is programmed to perform filtering operations on-chip or within the electronic circuitry that interfaces directly with the array detector.

According to one aspect of the invention, A spectral filter is provided, including a photosensitive array having a plurality of photosensitive elements, at least a subsection of photosensitive elements of the array along one direction thereof being configured such that each element of that subsection along the one direction receives light of a different wavelength range of a characteristic spectrum and produces an electrical signal corresponding thereto, with the subsection being configured to combine signals of at least two photosensitive elements and to output the combined signal as a measure of the optical energy within a bandwidth of interest of the characteristic spectrum.

According to another aspect of the invention, a method of performing spectral filtering using a photosensitive array having a plurality of photosensitive elements includes the steps of calibrating the array such that each element of the photosensitive array along one direction thereof corresponds to a different wavelength range of a characteristic spectrum projected onto the array; and configuring a read-out process of the array to combine signals of at least two photosensitive elements along said one direction, generated in response to illumination by the characteristic spectrum, as a measure of the optical energy within a bandwidth of interest of said spectrum.

The above and/or other aspects, features and/or advantages of various embodiments will be further appreciated in view of the following detailed description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The various embodiments of the present invention are shown in the accompanying figures by way of example and not limitation, in which.

DETAILED DESCRIPTION OF THE ILLUSTRATED EMBODIMENTS

Figure 1A:
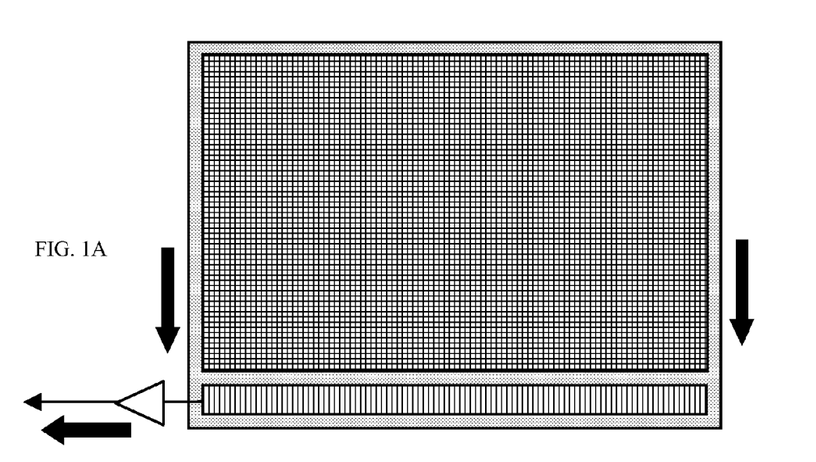
FIG. 1A is a diagram of a CCD array that is usable with the concepts of the present invention.

According to one embodiment of the invention, a CCD (charge-coupled device) array detector is used for hyper-spectral imaging and filtering. A CCD array consists of a matrix of pixels that are sensitive to light. In response to the impingement of light photons, individual pixels in the array generate a charge of electrons, the amount of which varies in proportion to the magnitude of light photons interacting with the pixel areas and proportional to exposure time. The resulting electrical signals are read out of the array and are interpreted to correspond to the amount of light that generated the electrical charges in the pixel layers. The most common CCD architectures used in the instrumentation industry today are Full-Frame, Frame Transfer, and Interline (progressive) Transfer. In the former two, the pixels are typically constituted by photodiodes and the generated charges from the pixels of the entire array are read out directly or transferred simultaneously to another storage array on the chip from which they are then read out. On the other hand, the progressive type, as shown in FIG. 1A, consists of pixels that perform a charge transfer function in addition to being photosensitive. The generated charges are transferred vertically line by line to an output stage, and are subsequently read out horizontally pixel by pixel. The interline transfer type of CCD array offers a number of advantages over its full-frame counterpart, particularly when sub-framing and read-out manipulations are needed. The following detailed description is thus based on the use of an interline transfer type CCD array for purposes of explanation; however, the concepts of the invention are not limited to the use of interline transfer CCD arrays as similar schemes can be easily devised by those skilled in the art from this detailed description to work for linear and full-frame area array CCDs.

Figure 1B:
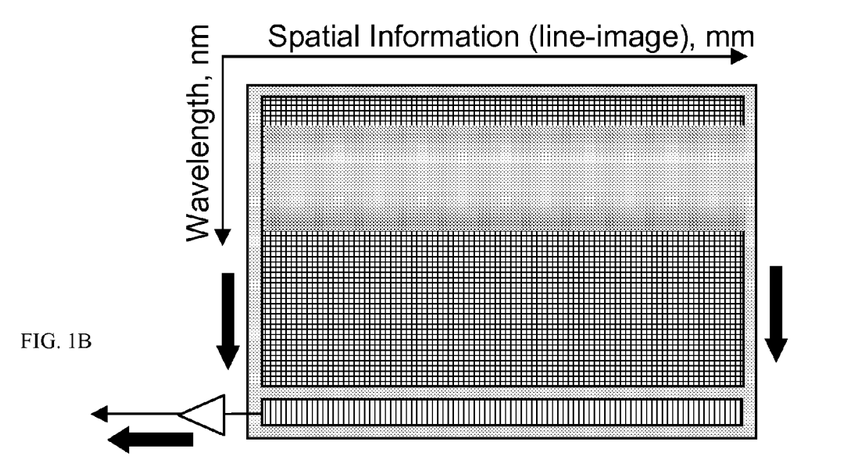
FIG. 1B is a diagram of a CCD array illustrating hyper-spectral line-imaging according to one embodiment of the invention.

When such a CCD array detector is used to image a two-dimensional scene, for example when used in a video capturing device, each of the pixels represents a separate point in space and therefore the electrical signal read from each pixel is mapped to represent an amount of light coming from a corresponding point in space. On the other hand, in a typical hyperspectral imaging configuration, the light from a single line in space is spread out over multiple detector pixel lines as indicated in FIG. 1B. In other words, the spectral content of the line image is projected onto the entire pixel area of the detector.

According to a key concept of the invention, instead of reading out the signals from all of the pixels and then manipulating and processing the read out data to obtain information of a desired spectral range post-acquisition, the array detector is programmed to select the desired range of pixels that correspond to a desired wavelength range to be measured, add their electrical signals together before being read out, and then read out only the summed signal. This method according to the invention saves a significant amount of time and processing power, and also substantially reduces the amount of storage capacity needed for storing and processing post-acquisition data. Two examples will now be given of specific implementations of the invention.

1. On-Chip Binning

When the line image is spectrally spread across the CCD array with a known nm/row spectral resolution (or nm/pixel spectral resolution for a line sensor imaging a point image), the specific rows in the array that correspond to a desired spectral filter can be easily identified and their charges binned together, i.e., their signals added together, before the data is read out of the detector. In this manner, only one row of pixels needs to be read out for each desired filter instead of each of the rows individually that constitute the filter, and thus the entire detection and data processing operation is considerably simplified.

Furthermore, binning pixels together before they are read out results in a significant improvement in the signal-to-noise ratio. More specifically, weak fluorescence signals that could be within the level of noise are added together before they are read out, and therefore have a significantly improved chance of being detected than if they were read out individually and added together later, as low level signals would be filtered out as noise and not stored. This results in an improved level of detection sensitivity, without any improvement in detector materials. The dynamic range of the total spectral window is however limited to the dynamic range of the analog-to-digital converter (ADC), because there is no post-acquisition summation.

2. Readout Binning

The "binning" function also can be performed by the read-out electronics. For example, through the use of a Digital Signal Processor (DSP) or Field-Programmable Gate Array (FPGA), one can program the readout electronics to add or "bin" together signals from the desired spectral range before they are fed to a host computer or other processing circuit. The summation of the entire spectral window results in an increase in the dynamic range, and since readout noise is typically a large component of the total pixel noise at a high frame rate, the total pixel noise is also increased because of the summation after the values have been read out of the CCD chip. Fortunately, the signals add more quickly than the noise, resulting in an increased signal-to-noise ratio. This method of binning thus can build the total dynamic range beyond that of the A/D converter.

Figure 2A:
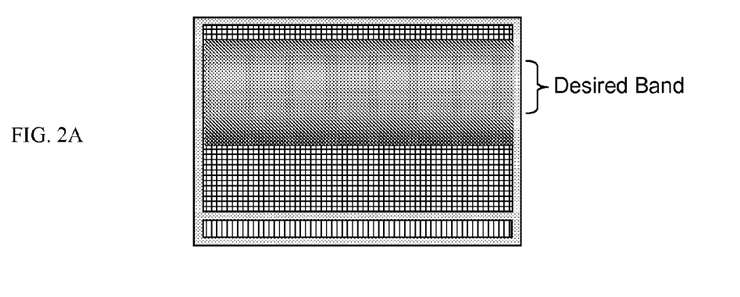
FIGS. 2A-2C are diagrams illustrating operation of a CCD array as a spectral filter for a single band of interest according to one embodiment of the invention.
Figure 2B:
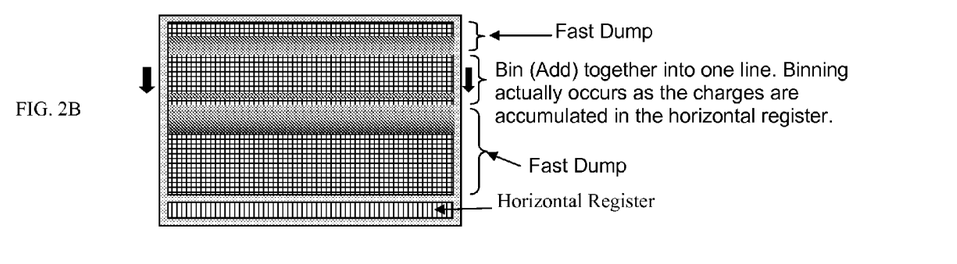
Figure 2C:
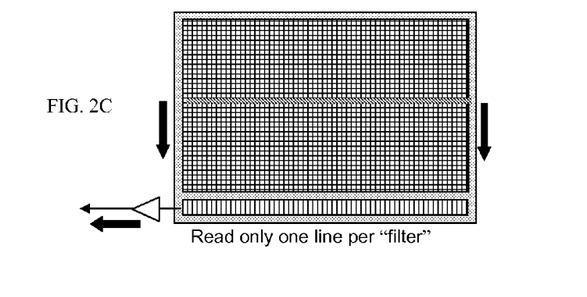

Two examples of readout binning according to the invention are shown in FIGS. 2A-2C and FIGS. 3A-3B. Where the desired spectral range is a single band of contiguous wavelengths as shown in FIG. 2A, each row of pixels in the desired band is binned or added together with the other rows in the band, to form a single line or row of pixels, while the remaining rows of pixels are simply discarded by being subjected to a "fast dump" or similar operation as shown in FIG. 2B, wherein the accumulated charge is quickly dissipated by coupling the unwanted pixel rows to ground or equivalent operation. The single line or row of pixels representing the summed data is then read out of the CCD chip pixel-by-pixel as shown in FIG. 2C.

Figure 3A:
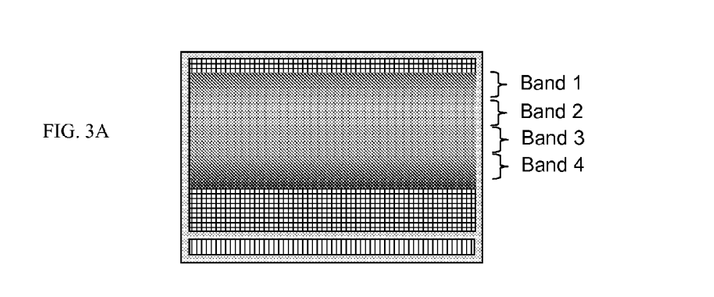
FIGS. 3A and 3B are diagrams illustrating operation of a CCD array as a spectral filter for multiple bands of interest according to one embodiment of the invention.
Figure 3B:
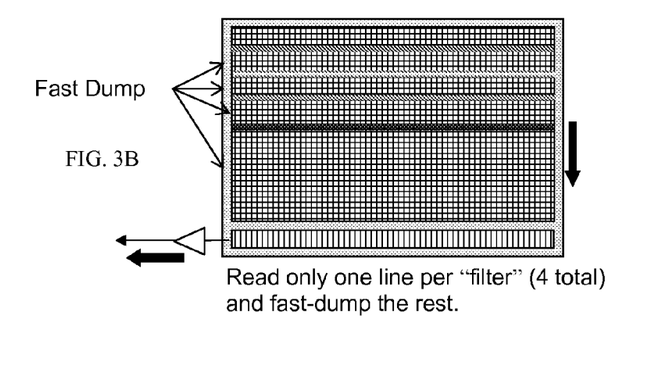

FIG. 3A shows an example where multiple spectral bands 1-4 are of interest. The rows of pixels within each band are summed or binned together to form a single line of pixels corresponding to the desired band, and the remaining pixel data is subjected to a fast dump operation and discarded as shown in FIG. 3B. Then, each single row of summed pixels corresponding to each of the bands 1-4 of interest are read out of the CCD chip in a pixel-by-pixel fashion.

The above-introduced spectral filtering technique can be applied to various multi-spectral and hyperspectral imaging methods that use array detectors. The invention contemplates that the technique will use a configuration that takes into account the desired feature requirements listed above. In this way, the results can be easily applied to develop a microarray imaging system with comparable capabilities.

A discussion of the considerations involved in choosing an optical system architecture will now be presented, followed by a discussion of various options that may be used for each of the sub-systems and a description of a specific illustrative system configuration according to an embodiment of the invention.

Figure 4:
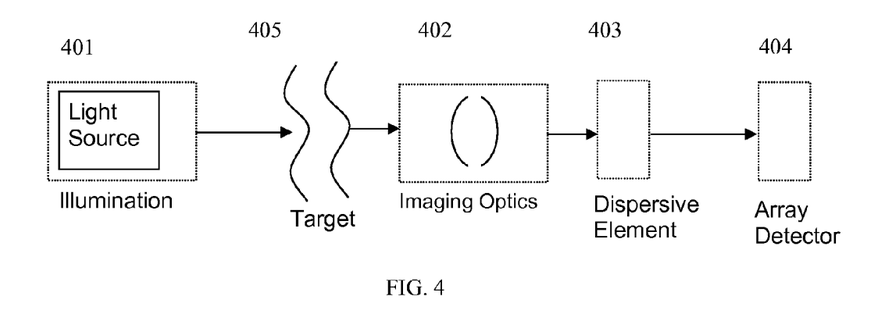
FIG. 4 is a diagram of an imaging system according to one embodiment of the invention.

FIG. 4 shows a diagram of a basic configuration for an optical system with hyperspectral/multi-spectral detection capability. It consists of an illumination source 401, imaging optics 402, a dispersive element 403, and an array detector 404. The choice of illumination source, imaging optic method, and type of array detector depend on the excitation wavelengths used, the desired imaging resolution, the size of the imaging area, the speed of image acquisition required, and cost considerations.

Imaging a target 405 microscope slide (25 mm×75 mm) at 5 μm spatial resolution rules out point imaging with mechanical scanning, such as in known point imaging products that use optical microscopes and various optical filters; imaging such a slide with a point source imaging apparatus would take hours, even though the point imaging produces a high illumination flux density and therefore good signal-to-noise performance. One can achieve faster acquisition times by replacing the mechanical scanning mechanism with one or more optical scanners, but at a much higher cost. Faster imaging also can be achieved using area CCD imaging, which is a method adopted by many microarray scanners. However, this approach requires the area CCD detector to be cooled considerably because a long CCD integration time on the order of tens of seconds per frame is required, as the illumination flux density that can be produced for area imaging is low. Further, the relatively long integration times cause different frames captured at different locations to have different levels of brightness, even for the same amount of fluorophore. This is known as a "tiling mismatch." A significant amount of effort has been made in the field in attempting to reduce this effect, but to no great success.

A better approach for imaging such a target is a balance between point-imaging and area imaging, such as line imaging with one-dimensional mechanical scanning. Imaging a line instead of an area means that all the illuminating light can be concentrated to produce a higher flux density and therefore relatively short integration times and only moderate detector cooling are needed. Furthermore, one can optimize the size of the imaged line to simplify the mechanical scanning needs and still achieve the other requirements. In particular, the width of a slide (25 mm) can be imaged with 5 µm resolution using a 5000 pixel long line array detector. Mechanical scanning thus is needed only along the length of the slide and frame tiling is avoided. The width of the illumination line preferably is matched to the desired resolution in the scanning direction, e.g., 5 µm in the described preferred embodiment. Doing so avoids the use of slit apertures as required for hyperspectral dispersion detection and which is often adopted by many prior art spectroscopic imaging solutions, such as in U.S. Pat. Nos. 6,495,818, 6,495,363, and 6,245,507. "Narrow" line illumination can be achieved by projecting a line with a diffraction-limited width; the latter can be produced through the use of diffraction-limited light sources, projecting slit apertures placed in the illumination path, or similar means.

Detector

The architecture of a system according to the invention can be designed by first selecting a CCD detector with a number of pixels close to 5000 and having good performance specifications. Imaging optics can be then selected to project the width of the target slide onto the CCD array with good chromatic correction and low distortion. A laser excitation source can be built to generate a matching illumination line, and an appropriate dispersive element can be selected to produce nm-scale spectral resolution over the CCD array surface. The various options available for these sub-systems and related measurements will now be discussed.

There are a number of features that are desired for a good CCD solution for a spectral filter as contemplated by the invention. Some of these are "large" format, ideally 5000-pixel long or more good Quantum Efficiency (QE), particularly in the near IR (700 nm-850 nm) range good sensitivity and low-dark noise fast readout rate fast dump capability in order to obtain high frame rates by dumping the portions of the array that are not needed fast electronic shuttering in order to precisely control the amount of integration anti-blooming reliable supply source One example of a CCD that matches the above requirements is the KAI-11000M manufactured by Eastman Kodak Company. CCD image sensor chips manufactured by Dalsa Semiconductor have been found to have similar specifications. Other commercially available chips with varying specifications also can be adapted to work in accordance with the concepts of the present invention, with some trade-offs in resolution or image size perhaps being necessary.

Figure 5:
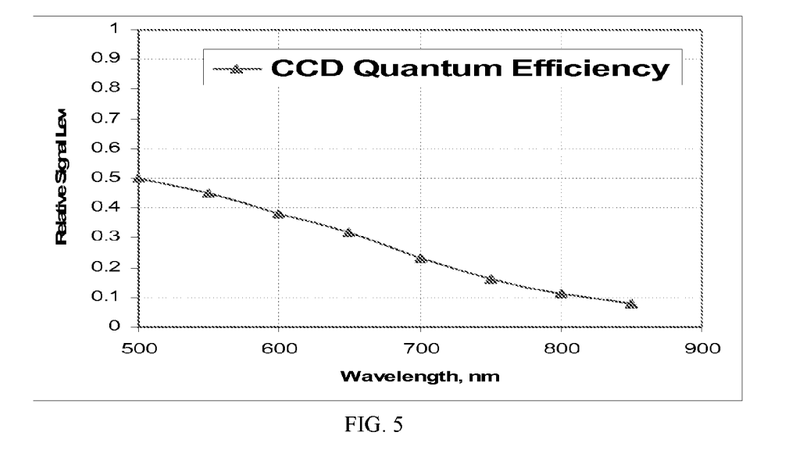
FIG. 5 is a chart showing quantum efficiency of a CCD usable with the present invention.

The specifications for the KAI-11000M CCD chip are listed in Table 1. Most interline CCD chips suffer from a reduced quantum efficiency (QE) performance as compared to full-frame transfer CCDs, because a portion of each pixel of the interline type CCD is used for storing charges to be transferred to adjacent pixels, and therefore not all of the pixel area is available for interaction with light photons. However, the KAI-11000M chip was found to have an architecture that uses a microlens on top of each pixel to enhance its collection efficiency. The quantum efficiency consequently is comparable to full-frame formats, while maintaining all the other advantages of the interline structure. The KAI-11000M QE is on the order of 12% at 800 nm, as shown in FIG. 5. While higher quantum efficiencies, including in the near-IR, are available with other CCD chips, they are smaller in size and therefore may not be acceptable for the desired scanning simplification according to the invention.

TABLE 1

| Parameter | Value |
| --- | --- |
| Architecture | Interline CCD; Progressive Scan |
| Total Number of Pixels | 4072 (H) × 2720 (V) = approx. 11.1M |
| Number of Effective Pixels | 4032 (H) × 2688 (V) = approx. 10.8M |
| Number of Active Pixels | 4008 (H) × 2672 (V) = approx. 10.7M |
| Number of Outputs | 1 or 2 |
| Pixel Size | 9.0 µm (H) × 9.0 µm (V) |
| Imager Size | 43.3 mm (diagonal) |
| Chip Size | 37.25 mm (H) × 25.70 mm (V) |
| Aspect Ratio | 3:2 |
| Saturation Signal | 60,000 electrons |
| Quantum Efficiency | 0.32, 0.27, 0.25 |
| Output Sensitivity | 13 µV/e |
| Total Noise | 30 electrons |
| Dark Current | <50 mV/s |
| Dark Current Doubling Temperature | 7° C. |
| Dynamic Range | 66 dB |
| Charge Transfer Efficiency | <0.99999 |
| Blooming Suppression | >1000X |
| Smear | <−80 dB |
| Image Lag | <10 electrons |
| Maximum Data Rate | 28 MHz |
| Package | 40-pin, CerDIP, 0.070" pin spacing |
| Cover Glass | IR Cutoff or AR Coated |

Figure 6:
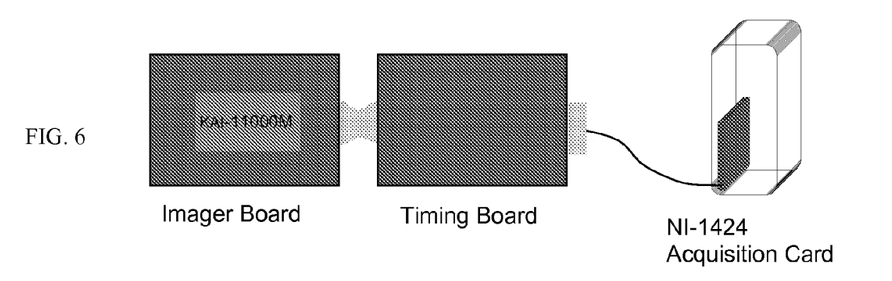
FIG. 6 is a diagram of imaging and timing electronics circuit system in accordance with an embodiment of the invention.

Evaluation electronics boards that allow for modification of the manner in which data is read out of the CCD chip are known in the art and are commercially available from various companies including Eastman Kodak. One such system as shown in FIG. 6 consists of a CCD chip mounted on an imaging board that is connected to a timing generator board. The timing generator board in turn is connected to an image acquisition card residing in a host computer. A timing board can use a Complex Programmable Logic Device (CPLD), such as the 7000S ISP PLD sold by Altera Corporation, to generate the required clock signals from a 60 MHz system clock. The various CCD functions performed according to the invention, including timing controls, fast-dumping, electronic shuttering, binning, etc. can be accomplished by programming this device.

Imaging

Figure 7:
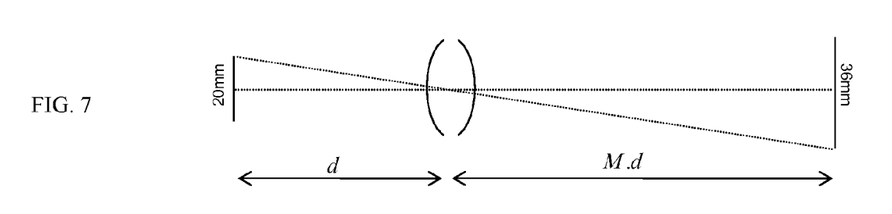
FIG. 7 is a diagram showing imaging considerations in accordance with the invention.

The use of a 4000-pixel long CCD means that only 20 mm-long lines can be imaged with 5 µm resolution, i.e. 4000×5 µm=20 mm. The length of the KAI-11000M CCD is ~4000×9 µm=36 mm. As indicated in FIG. 7, the task is to project (image) a 20 mm-long line onto the CCD array such that it covers the entire 36 mm side of the CCD with chromatic correction across the visible and near IR ranges (i.e., 500 nm to 900 nm), with a good collection efficiency and minimal distortion. This means that the imaging system will be operating at a magnification M (object-to-CCD) of $$M = \frac{36 \text{ mm}}{20 \text{ mm}} \approx 1.8x$$

One option is to use a single lens reflex (SLR) camera-type lens that is designed for at least 35 mm film/CCD formats. This size presents more challenges than 0.5", ⅔", and 1" formats and therefore only higher-end lenses can achieve good color and distortion corrections. Furthermore, it is desired to use a lens with a low F-stop number in order to maximize the collection efficiency. This narrows the choices to lenses within the class of Macro-imaging. A number of lenses designed and marketed for consumer macro-imaging applications are known and commercially available for this purpose. While not inexpensive, such lenses tend to be much more economical than designing a special lens for the particular application.

Figure 8:
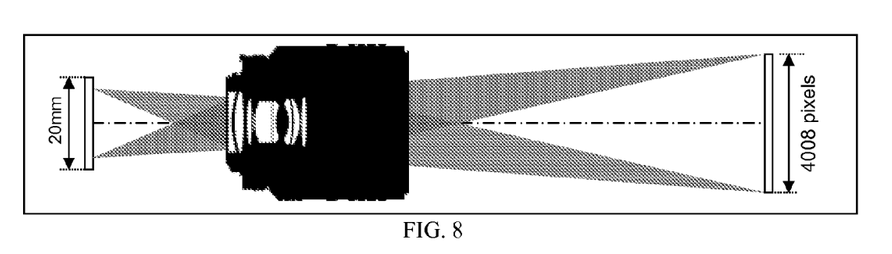
FIG. 8 is a diagram of exemplary imaging optics of the system of FIG. 4.

A number of lenses of focal lengths ranging from 25 mm to 75 mm with F-stops in the range of 1.8 to 2.8 were tested in accordance with the objectives of the invention. The AF Micro-Nikkor 60 mm 1:2.8 D available from Nikon Corporation showed better overall performance than other lenses. The lens is designed for a 35 mm detector size and to operate with the object being at the longer working distance side of the lens. However, since the lens is symmetric, it can be used in reverse so that the 20 mm line dimension is projected onto the larger 36 mm CCD (see FIG. 8). While this lens works well, it is built with certain automation features which make its size larger than it could otherwise be. A similar lens without the automation features and thus smaller would be preferable for some applications contemplated by the present invention.

Illumination (Excitation) Source

In order to image a 20 mm-long line target with 5 μm resolution and maximum illumination flux density for each pixel point, the optimal illumination light source needs to generate a 20 mm×5 μm uniform line and project it onto the width of the microscope slide. However, in order to limit the solution to illumination sources within reasonable cost ranges, the uniformity requirement must be relaxed somewhat. A target of 80% was set for the uniformity of line illumination in accordance with the invention. This is a reasonable parameter for the illustrative application disclosed here and can be calibrated out without any major downside tradeoff.

Two main variables to be considered in designing and using such line illumination generators are 1) wavelength and type of light sources and 2) angle of incidence. The first variable depends on the wavelength of interest and available sources for generating such wavelength, while the second variable depends on the type of target sample that can be used with the system. Two types of light sources were tested in accordance with the invention: a white light source and two-wavelength laser diodes (685 nm and 785 nm.) A brief description of these solutions and the related test results are presented below.

White Light

Figure 9:
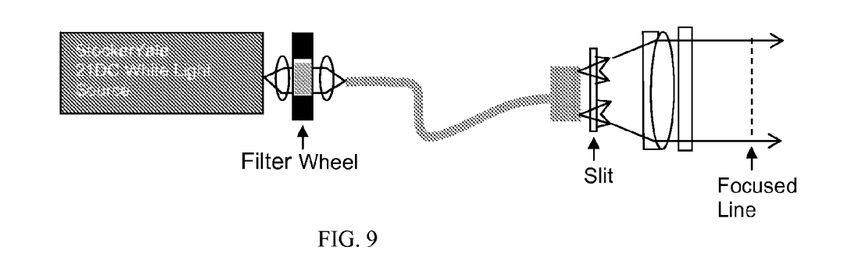
FIG. 9 is a diagram of an exemplary illumination source of the system of FIG. 4.
Figure 10:
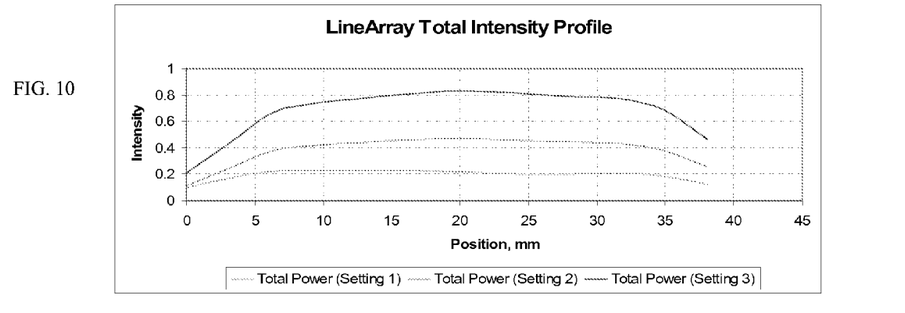
FIG. 10 is a chart of measured illumination uniformity of the source of FIG. 9.

A 150 W halogen lamp source with a line array fiber optic coupling was selected as a white light source, as shown in FIG. 9. The output side of the optical fiber is ~38 mm by 0.25 mm. This was used in combination with a focusing lens and 10 μm wide optical slits to generate the desired line. The measured uniformity with this set-up was about 80% and, using a band-pass filter of 10 nm bandwidth, the flux density was about 1 nW/μm2, or equivalently, 0.025 μW/pixel. A graph of the measured uniformity is presented in FIG. 10. The low flux density necessitated longer CCD integration times than desired and therefore this configuration was not considered optimal. Higher flux densities are desirable and therefore parameters of the configuration could be varied to increase the illumination flux density. For example, a higher wattage light source could be used in combination with higher-temperature optic fiber, or alternatively parabolic focusing mechanisms could be used to further concentrate the illumination light to produce a higher flux density.

Two-Wavelength laser Source

Figure 11:
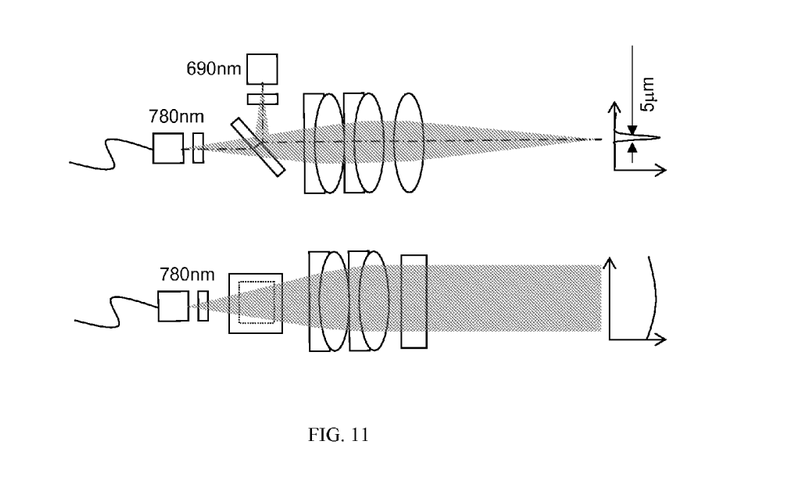
FIG. 11 is a diagram of another exemplary illumination source of the system of FIG. 4.
Figure 12:
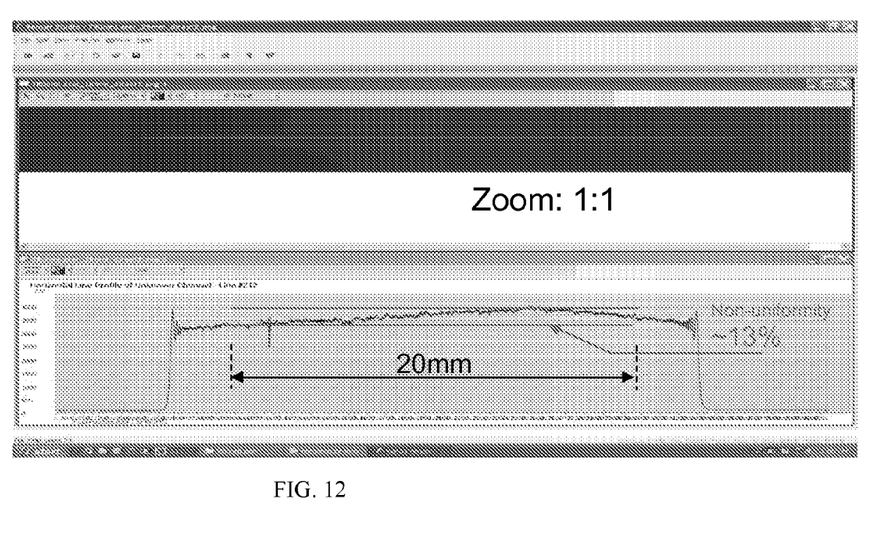
FIGS. 12 and 13 are charts show a measurement of the uniformity, line-width, and flux densities achieved with the laser illumination light source of FIG. 11.
Figure 13:
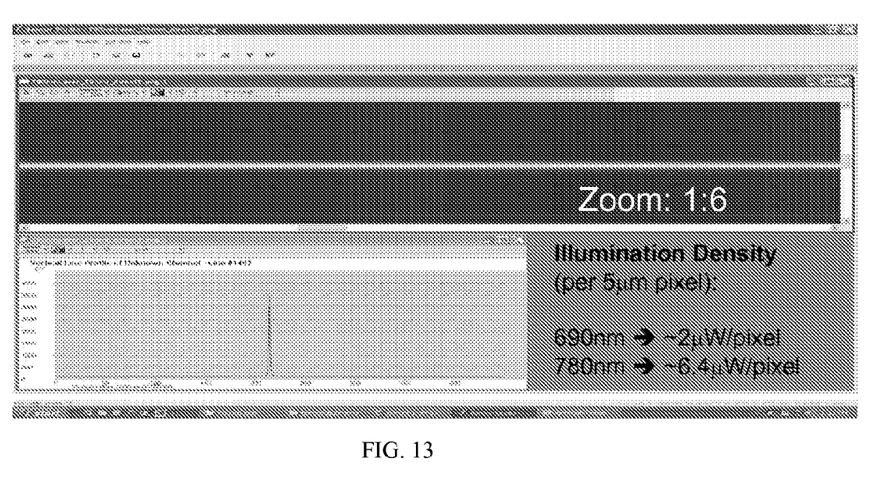

Another illumination line generator was built using two laser diodes (685 nm and 785 nm). These wavelengths match commercially available 700 nm and 800 nm dyes. The lasers used in this set-up were the Hitachi HL 6738MG, λ=690 nm, 35 mW, and the QPhotonics QLD-780-100S, λ=780 nm, 90 mW. FIG. 11 shows a diagram of the optics used in building the illumination line generator tested in accordance with the invention. In this configuration, other lasers can be added as needed. FIGS. 12 and 13 show a measurement of the uniformity, line-width, and flux densities achieved with the laser illumination light source. The uniformity and line-width are measured by directly focusing the generated line onto the KAI-11000 CCD and the flux densities are measured using an optical power meter placed at the focused line.

Co-Axial vs. Angular Illumination orientation

Figure 14:
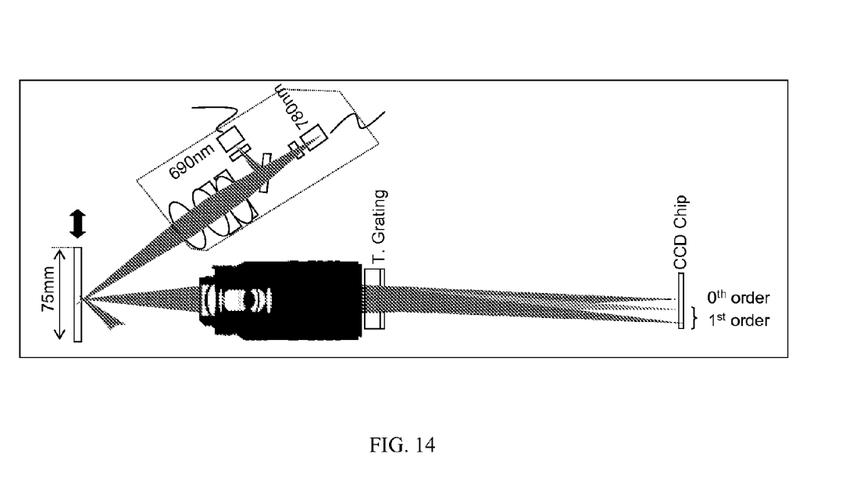
FIG. 14 is a diagram showing angular illumination of a target to be imaged according to another aspect of the invention.

As shown in FIG. 14, illuminating the sample at an angle reduces the amount of scatter collected by the imaging optics. This is important for samples with high scattering/reflection characteristics, such as membrane-coated slides and glass surfaces.

Scattered and reflected signals are usually significant compared to fluorescence signals. As one anticipated use for the invention includes membrane-coated and glass-type slides, angular illumination may be preferred over co-axial illumination, unless rejection filters with good blocking capabilities are used.

Angular illumination incidence can also be used to measure defocus. On the other hand, co-axial illumination with good rejection filters can be helpful for avoiding defocus effects in spectral filtering.

Dispersion Element

In order to set spectral filters at the CCD array, the optical signal collected by the imaging optics needs to be spread (i.e., diffracted or distributed) across the dimension of the CCD that is perpendicular to the direction of the imaged line. The amount of spectral spread is determined by the desired spectral resolution. For purposes of illustration, the spectral resolution can be set to an exemplary linear spread of 1 nm/pixel. This is equivalent to spreading the colors of the optical signal with a 1 nm spread over each row of pixels or 400 nm over 400 pixel rows.

This type of hyperspectral dispersion can be accomplished through a variety of methods, as discussed earlier. To keep the solution simple, only one dispersive element is used for the embodiment of a system as shown in FIG. 4. Two types of dispersive elements are considered here: Prisms and Transmission Gratings.

Prism: An equilateral prism is one of the most economical dispersive solutions available; however prisms typically are used for applications with low spectral resolution, and they require angular adjustments, which complicate the mechanics. Also, prism placement in an imaging path can be critical as field curvature can be introduced when the prism is placed in non-parallel field directions. These challenges may be difficult to overcome with the dimensions (field size and spectral resolution) of some applications that are contemplated by the invention.

Figure 15:
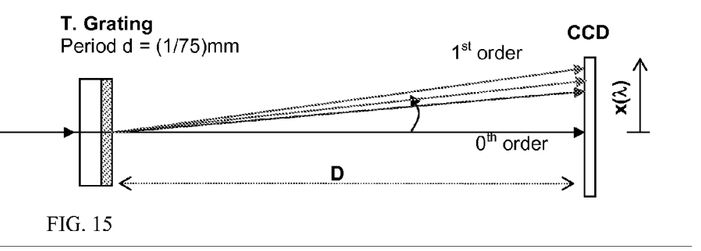
FIG. 15 shows an exemplary dispersive element of the system of FIG. 4.

Transmission Grating: The use of transmission gratings simplifies the overall mechanical mounting requirements. The operating parameters of a transmission grating are defined as shown in FIG. 15.

Figure 16:
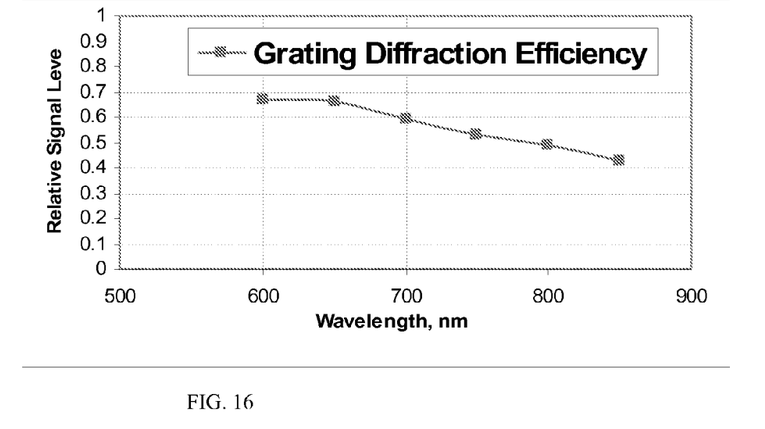
FIG. 16 is a chart of diffraction efficiency of the dispersive element of FIG. 15.

The condition for the first diffraction order of a transmission grating is given by $\lambda = d \cdot \sin \beta_1$, $x(\lambda) = D \cdot \tan \beta_1$, and $$\frac{\Delta \lambda}{\Delta \beta_1} = \frac{\lambda}{\tan \beta_1}$$

where $\lambda$ is the wavelength of light, D is the distance to the CCD, and d is the grating period, or groove spacing. In order to obtain a 1 nm per 9 μm pixel wavelength spread and using a grating with 75 lines/mm, D=120 mm and $\beta_1$ needs to be ~3°. Such small deviation angle results in minimal degradation of the image quality across the whole field. At these small angles, $\sin \beta_1 \approx \tan \beta_1 \approx \beta_1$, and therefore $$x(\lambda) = \frac{D}{\sqrt{\left(\frac{d}{\lambda}\right)^2 - 1}} = N_\lambda \times 9 \text{ μm}, \Delta \lambda = \left(\frac{d}{D} \times 9 \text{ μm}\right) \Delta N_\lambda$$

where $N_\lambda$ is the number of CCD rows. FIG. 16 shows the diffraction efficiency of a 75 line/mm grating obtained from Diffraction Products, Inc. This can be optimized by designing the blaze wavelength of the grating to match a desired wavelength of the system for maximum efficiency.

Imaging & Spectral Filtering

Figure 17A:
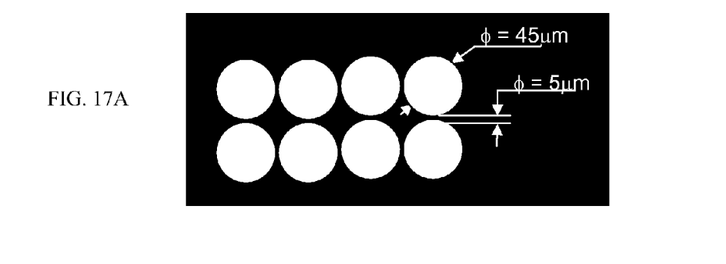
FIGS. 17A and 17B are diagrams showing an example of the imaging resolution capability according to the invention.
Figure 17B:
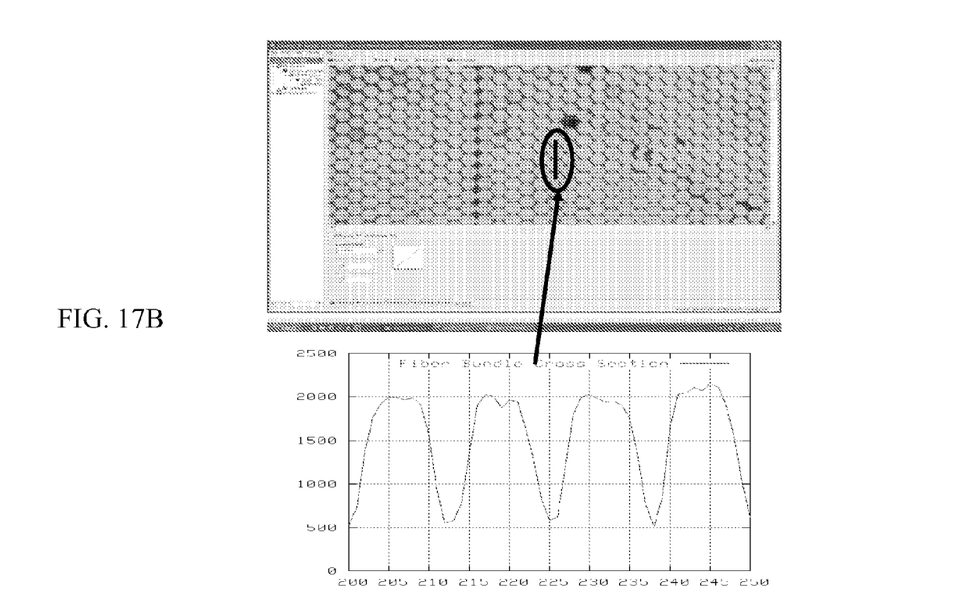

A fiber bundle with 50 μm diameter fiber, depicted in FIG. 17A, was imaged to confirm that 5 μm feature sizes are detectable by the system. The fibers have a 45 μm core and 2.5 μm thick cladding. The non-guiding gaps in a bundle packed with these fibers are equal to 5 μm. Light was coupled into the bundle, the output end was imaged by the imaging system and, as shown in FIG. 17B, the gaps are clearly visible.

Scattering rejection: Scattering from an excitation laser can be much stronger than the fluorescence level from the fluorophore, even if the illumination impinges on the target at an angle to avoid the collection of specular reflection. A strong scattering signal can result in the saturation of the detector, which would make the identification of the fluorescence part of the imaged spectrum impossible or extremely difficult, especially in the case of membrane-coated slides. Therefore, in order to achieve acceptable results, scattering must be blocked or at least reduced to a level that is comparable to the level of the fluorescence signal.

A rejection filter placed in the optical path, for example between the imaging optics and the dispersive element, can be used to reduce the scattering down to the fluorescence level. The rejection filter can be designed to reject >90% of the wavelength range of the excitation source and to pass >95% of the fluorescence range of the emission from the illuminated target. In this way the scattering level is reduced so that it can be easily identified and thus eliminated when the binning spectral range is defined. The binning range is defined to include only pure fluorescence and thus spectral ranges outside of the defined range, which include the scattering range, can be effectively forced to zero. This method may exhibit better results than the use of emission filters to block the scattering spectral range to OD6 or better, since even with such optical filtering, a strong scattering signal can result in a detectable level that would interfere with the fluorescence detection.

This is a significant differentiation from all other conventional spectral filtering techniques, which aim at reducing the amount of detectable optical signal outside the desired spectral bandwidth to a low level, such as to OD6 or better, but not to zero. According to this aspect of the present invention, on the other hand, the signal level outside the desired range is forced to zero by excluding it during the binning. This results in a significantly better optical signal-to-noise performance.

Spectral Calibration: In order to accurately and reliably identify the spectral locations and bandwidths of the desired filters, the pixel row numbers of the chip need to be mapped to actual wavelength values. This task is simplified by the fact that in the 1 nm/pixel regime, the spectral spreading is linear. Therefore, only one source with a known wavelength distribution will suffice. For example, the scattering from an excitation wavelength at 685 nm or 785 nm can be aligned to a desired row number and the corresponding wavelength assigned to that row number. For even higher accuracy, two known wavelengths can be used simultaneously to identify the corresponding row number and the per row wavelength change. In accordance with the invention, a number of measurements were taken with 685 nm and 785 nm laser diodes and a white light source having 600 nm, 650 nm, 700 nm, 750 nm, 800 nm, and 850 nm thin-film band-pass filters. The results confirmed that the spectral resolution is linear and is directly related to the distance between the 75 lines/mm transmission grating and the CCD.

Imaging with Spectral Filtering: Once the rows of the CCD sub-frame are mapped to wavelength values and the positions corresponding to the desired filter are identified for spectral binning, the imaged line is scanned across the target and a 2-D image is generated for each filter by combining the outputs from binned line corresponding to the same filter together. The on-chip filtering operation, then, involves programming the CCD to bin together the rows that correspond to pure fluorescence, and to zeroing out the spectral range outside the pass-band by fast-dumping the rows that correspond to scattering. Alternatively, those rows may be masked to prevent them from receiving any light.

Two-Dimensional Scans: 2-D scans are obtained by translating a target sample in a direction perpendicular to the imaged line and reading data at a rate of 50 frames/second, i.e. 50 images/second. Experimental tests confirmed good reduction of background noise, and much better noise reduction capability than thin-film bandpass filtering as done in some prior art apparatus.

Optional Enhancements

In a CCD, the charges that are collected by the photodiodes can be coupled together and moved around the array by proper application of clock signals to the inputs of the array. There is thus a large amount of flexibility in how the charges are read out of the device. In the most basic and common read-out, the frame read-out begins by performing a vertical transfer. The vertical transfer moves each row of charges down to the next storage row. The final row in the array gets moved into a horizontal register. Next, a horizontal transfer is performed to read each pixel that is contained in the horizontal register out one at a time. When complete, the next vertical transfer is performed, and this continues until each pixel has been read out of the CCD array.

For imaging a photograph, this is exactly what is desired. For hyperspectral row imaging, a more complex technique can be used to improve read-out time (frame rate), and collect and compress the amount of data that needs to be processed. The following sections discuss the important techniques that were used to achieve the desired performance.

Fast Dump: fast dump is a way to quickly remove signals from unneeded rows of the CCD. If the Fast Dump Gate (FDG) is enabled prior to and during the vertical transfer, the charge contained in the final row of the CCD is erased rather than added to the horizontal transfer register. This allows the next vertical transfer to take place without ever performing the horizontal transfer. This allows for a large savings in read time since the vertical transfer occurs much faster than the entire horizontal transfer (10 µs versus 146 µs for a single row in the present case). This feature of the CCD is important to the overall speed of the system.

Electronic Shuttering: Electronic shuttering allows for a programmable amount of integration time per frame. The length of the integration time can be either shorter or longer than the frame read-out time. This flexibility allows for adjusting the gain of the image. A longer integration time proportionally boosts the gain.

Fast Sub-frame Rates: One goal of the present invention was to obtain a rate of 50 frames per second (fps) collected from the CCD. This rate is required to scan 75 mm at 5 µm resolution (15,000 lines), in 5 minutes. The Fast Dump feature was helpful, but the implementation at the time of testing was not sufficient to obtain the desired goal. For example, if it is desired to read four 50 nm wide spectral windows using dual analog outputs, it would take (4 windows×50 rows/window×78 µs/row)+(2520 rows×10 µs/row)=40.8 ms, which is only 24.5 fps. 2520 is the number of unused rows in the CCD array, which are "fast dumped" at a rate of 10 µs/row. Since all pixels are active, the entire array has to be read out in order to clear the CCD storage array each frame. Two techniques were used to dramatically increase the frame read-out time: masking and spectral binning.

Masking: In the example case above, most of the rows of the array are not being used for useful data acquisition. The time required to fast dump all those unused rows was prohibitory to achieving the desired 50 fps rate. From the previous example, 25.2 ms of the total frame acquisition time of 40.8 ms was required just to purge the unused area of the CCD array. By masking the unused area of the array, the masked pixels are no longer subject to interaction with light. Therefore while signals from the masked rows would be added to the read rows, the masked row signals are near zero (there is some slight dark noise associated with the masked rows, but it is very small in comparison to other noise sources in the system). By masking off the unused rows, a huge time advantage is achieved. In the same example, if only 450 rows are read out (200 unmasked rows+250 rows for mask alignment calibration (which can be fast-dumped)), then the total frame readout time is 4 unmasked windows×50 rows/window×78 µs/row+250 mask alignment (fast dump) rows×10 µs/row=18.1 ms. This rate is 55.2 fps and more than achieves the desired 50 fps goal. An alternative to masking off part of a large CCD such as used in this testing, is to use a rectangular CCD with a length that matches the desired spectral window, e.g., 4000×450 format for 500 nm-950 nm at a resolution of 1 nm/row.

Spectral Binning: Multiple rows of a CCD can be added together on the CCD chip before being read out, as explained above. This is accomplished by performing two or more vertical transfers without performing a horizontal transfer. While similar to the Fast Dump technique, the difference is that the FDG line is not activated during the vertical transfer. In this case, the charge from the final row of the CCD is added to the contents of the horizontal transfer register. In the configuration tested, this allows any number of sequential wavelength rows to be combined on-chip. This allows the creation of custom spectral filters just by changing which portions of the frame are binned and which are fast dumped.

This method represents a significant advantage. Because the noise of the CCD is dominated by read noise at high frame rates, a significant penalty is paid each time a pixel is read out. By combining the small pixel signals on the CCD before reading them out, the read-noise penalty is paid only once per spectral window. The trade-off in doing this is that the horizontal transfer register can only hold the charge of two full-value pixels. For a 30 to 50 nm spectral filter, 30 to 50 rows would be added together. If the fluorescence signal is large, then adding 30 to 50 pixels together into a horizontal pixel that can hold only as much as 2 full pixels will very likely saturate the pixel. The dynamic range of the horizontal register is however still limited by the resolution of the A/D converter used. The positive side of this is that the Limit of Detection (LD) can be improved because the entire signal is added together without paying the read-noise penalty. Also, the flexibility offered by this spectral binning method allows for sub-dividing the spectrum for each filter into sections with a varying number of lines binned so as to avoid saturating the pixels; This way, good LD is achieved as well as maintaining good Dynamic Range (DR). The LD also can be improved by increasing the S/N ratio at low signal levels. This can be achieved either by increasing the signal level and/or reducing the noise. The signal can be increased by increasing the power of the illumination source and/or lengthening the CCD integration time. At the same time, the noise can be reduced by reducing the read-out noise and optical background noise. This may be accomplished by controlling the rejection filter specifications as well as the spectral binning performance.

There are two additional significant benefits to this method. First, adding two rows together on the CCD takes only 10 µs, whereas reading out a row to be added externally would take 78 µs. So the total frame read-out time is much faster. Secondly, since now only one row per filter window is being read, there is no post-acquisition processing to execute. Post processing each 1 nm row and combining them into a total spectral window would require the use of a fast DSP or FPGA chip, and a relatively large amount of fast memory. As an example of the time savings, assume the same 4 windows each 50 nm wide, with a total of 450 rows being read out per frame. With on-chip spectral binning, this would take 4×(49×10 µs)+(4×78 µs)+(250×10 µs)=4.77 ms. Without on-chip spectral binning, this would take 4×(50×78 µs)+(250×10 µs)=18.1 ms. This is an almost 4× improvement in the frame read-out time alone, with no post-acquisition processing being required.

Figure 18:
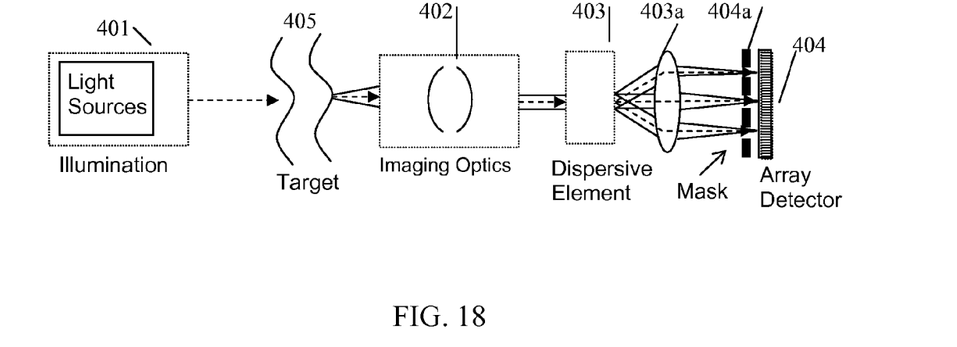
FIG. 18 is a first alternate embodiment of the system of FIG. 4.
Figure 19:
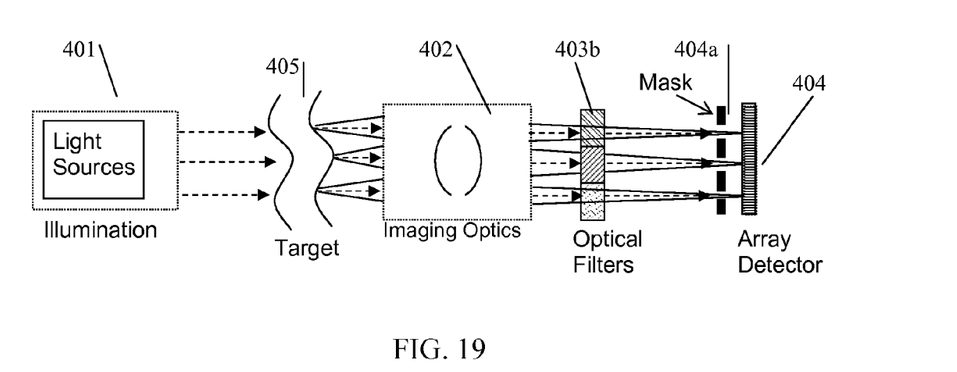
FIG. 19 is a second alternate embodiment of the system of FIG. 4.

FIGS. 18 and 19 illustrate alternate embodiments of the system of FIG. 4. Instead of spreading the entire spectrum of the light from the target across the entire array of photosensitive detector elements, the embodiments of FIGS. 18 and 19 are based on focusing selected ranges of the spectrum of the target onto a smaller number of detector elements.

FIG. 18 shows a first configuration for an optical system with hyperspectral/multi-spectral detection capability, as an alternate embodiment of the system of FIG. 4. Like reference numerals in FIG. 18 denote like elements of FIG. 4. The system of FIG. 18 includes an illumination source 401, imaging optics 402, a dispersive element 403, and an array detector 404. In this embodiment, the dispersive element includes optics such as a confocal lens or combination of lenses 403a, which reorients the spectrally dispersed light from the dispersive element 403 such that it condenses desired spectral ranges of light from the dispersive element onto the photosensitive array 404 at a nearly normal angle to the surface of the photosensitive array 404, and such that desired spectral ranges are focused onto a smaller number of photosensitive elements of the array 404. Additionally, a mask 404 a may be added between the optics 403a and the photosensitive detector array 404, to block light from undesired spectral ranges from impinging on the photosensitive detector array.

A second alternate embodiment of the system is shown in FIG. 19, wherein, instead of a dispersive element and associated focusing optics, a number of optical filters 403b are provided between the imaging optics 402 and the photosensitive detector array 404. Each of the optical filters rejects light from undesired spectral ranges and passes only light in a desired spectral range, to the array detector 404. Mask 404a further prevents unwanted light from impinging on the detector array.

Figure 20:
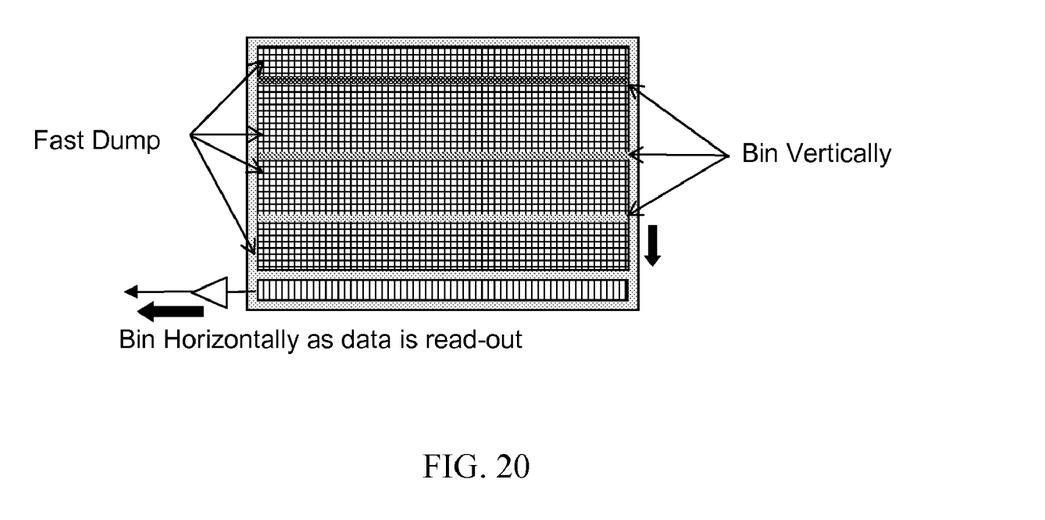
FIG. 20 is a diagram illustrating operation of a CCD array as a spectral filter for multiple bands of interest according to the embodiments of the invention shown in FIGS. 18 and 19.

As shown in FIG. 20, according to the alternate embodiments of FIGS. 18 and 19, light emissions from the target are pre-filtered to select only certain desired spectral ranges, which are focused onto subsets of the photodetector element rows. Thus, as shown in the example of FIG. 20, only three selected spectral ranges are detected by selected rows of the photosensitive array, with a fast dump being applied to the remaining rows. The selected rows are still binned together to an output stage, and then read out horizontally. However, instead of the entire spectrum of the target emission being spread over the entire array, with each row corresponding to a single wavelength, only certain selected spectral ranges may be applied to certain selected rows of the array, with each row corresponding to a selected spectral range instead of a single wavelength.

In summary, a new spectral filtering apparatus and method has been presented, which enables the functions of hyperspectral/multi-spectral imaging to be performed with increased speed, simplicity, and performance that are required for commercial products. Some of the advantages of the invention are:

1. Speed: On-chip spectral filtering achieves minimal data readout requirements and virtually no post-acquisition processing;
2. Filtering flexibility: The number of spectral filters and their parameters are implemented by programming the CCD and can be changed at will;
3. Parallel detection of overlapping fluorescence: The same CCD can be used to detect emissions that span the same spectral range at the same time. This can be achieved by simply spatially offsetting their corresponding excitations;
4. Improved scattering rejection: Rejection filters are used to reduce the amount of scattering to the level of fluorescence, in order to avoid saturating the CCD. Any remaining amount of scattering is then forced to zero by the filtering operation. This results in an improved S/N;
5. Reduced noise. The on-chip binning prior to the readout pre-amplification results in a significant reduction in total read noise;
6. Improved Limit of Detection: This results primarily from binning weak signals together prior to the addition of read noise;
7. Increased Dynamic Range: Fast shuttering and fast detection allow for more than one exposure per each line image. This results in an increased dynamic range capability. Also, the control of integration time improves the limit of detection and dynamic range;
8. Depth information: Angular illumination allows for measuring the height variations of the imaged surface and therefore provide for a way to correct for defocus. The same concept can be applied to produce 3-D images;
9. Confocality: Angular illumination with array detection can also be used to apply confocal aperture operations and therefore obtain confocal images; and
10. Extended range of applications: This method can be used in many applications that use multi-spectral or hyperspectral detection such as in microscopy, remote sensing, space imaging, and military focal plane array applications.

Additionally, while the invention has been described with respect to the use of CCD arrays, it is contemplated that other photosensitive technologies also may be used with the concepts of the invention, including APD, CMOS and PMT.

Defocus correction is also possible with the invention, wherein a zero order line would be used for focusing, and higher order regions used for spectral content detection. Focus correction could be carried out by linking the focus to spectral information, either pixel-by-pixel, or by taking the average of the offset value.

What is claimed is:

1. A system for spectral imaging of a target, comprising:
   a photosensitive array having a plurality of photosensitive elements;
   an illumination source for excitation of said target;
   imaging optics that focuses and spreads light emitted from said target in response to excitation from said illumination source over said photosensitive array, including optics condensing spectrally dispersed light from said target such that different desired spectral ranges are condensed onto selected subsections of photosensitive elements of said array; and
   output electronics coupled to said photosensitive array and receiving electrical signals from said photosensitive elements, combining signals of at least two photosensitive elements in a subsection and outputting said combined signal as a measure of the optical energy within a bandwidth of interest of said characteristic spectrum.

2. The system of claim 1, wherein said array is a CCD array.

3. The system of claim 1, wherein said illumination source is a laser source.

4. The system of claim 3, wherein said laser source comprises a plurality of lasers, each producing light of a different wavelength.

5. The system of claim 1, wherein said imaging optics comprises a focusing lens and a dispersive element.

6. The system of claim 1, wherein said dispersive element is a transmission grating.

7. The system of claim 1, wherein said dispersive element is a prisms.

8. The system of claim 1, wherein said output electronics is programmable to select different combinations of photosensitive elements for signal combination.

9. The system of claim 8, wherein said photosensitive array is an area array, and said output electronics is programmable to select different lines of photosensitive elements for signal combination.

10. The system of claim 8, wherein said photosensitive array is a line array, and said output electronics is programmable to select different photosensitive elements for signal combination.

11. The system of claim 1, further including a mask positioned to block undesired spectral ranges of light from impinging on said photosensitive array.

12. A system for spectral imaging of a target, comprising:
a photosensitive array having a plurality of photosensitive elements;
an illumination source for excitation of said target;
imaging optics that focuses light emitted from said target in response to excitation from said illumination source over said photosensitive array;
at least one optical filter that rejects selected undesired spectral ranges of light from said imaging optics such that desired spectral ranges of said light from said imaging optics are condensed onto selected subsections of photosensitive elements of said array; and
output electronics coupled to said photosensitive array and receiving electrical signals from said photosensitive elements, combining signals of at least two photosensitive elements in a subsection and outputting said combined signal as a measure of the optical energy within a bandwidth of interest of said characteristic spectrum.

13. The system of claim 12, wherein said array is a CCD array.

14. The system of claim 12, wherein said illumination source is a laser source.

15. The system of claim 14, wherein said laser source comprises a plurality of lasers, each producing light of a different wavelength.

16. The system of claim 14, wherein said laser source comprises a plurality of lasers, with light emissions from said target caused by each of said plurality of lasers passing through at least one optical filter.

17. The system of claim 12, wherein said imaging optics comprises a focusing lens.

18. The system of claim 12, wherein said optical filter comprises a plurality of optical filters, each of which prevents predefined undesired spectral ranges of light from impinging on said array.

19. The system of claim 12, wherein said output electronics is programmable to select different combinations of photosensitive elements for signal combination.

20. The system of claim 19, wherein said photosensitive array is an area array, and said output electronics is programmable to select different lines of photosensitive elements for signal combination.

21. The system of claim 19, wherein said photosensitive array is a line array, and said output electronics is programmable to select different photosensitive elements for signal combination.

22. The system of claim 12, further including a mask positioned to block undesired spectral ranges of light from impinging on said photosensitive array.

* * * * *